Figure 1:
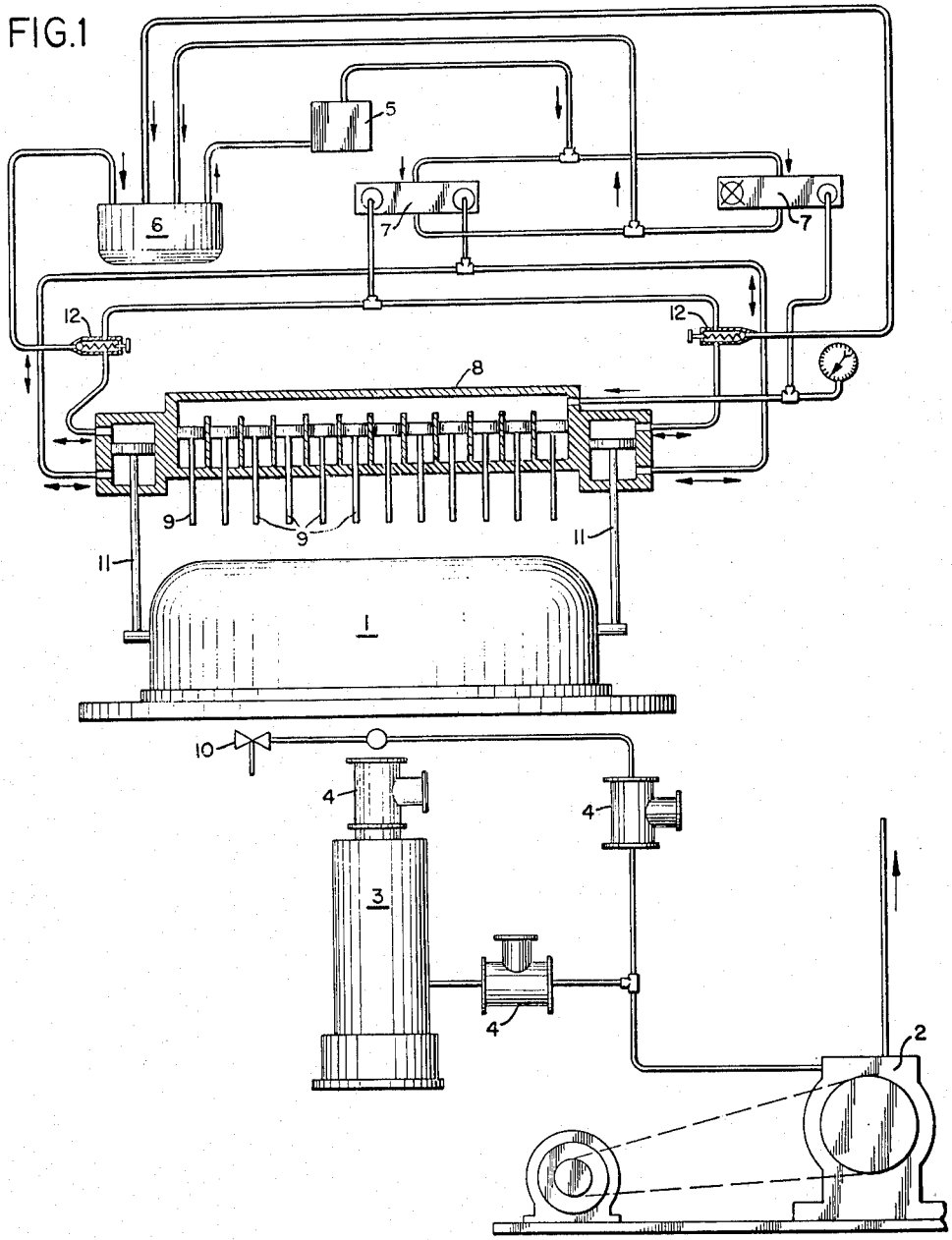

United States Patent Office 3,257,539
Patented June 21, 1966

3,257,539
APPARATUS FOR DIFFUSION JOINING IN A VACUUM OF METALS, ALLOYS AND MATERIALS DIFFERENT IN KIND
Nicolay Fedotovich Kazakov, ul. Gorkovo 44, Apt. 10, Moscow, U.S.S.R.
Original application Feb. 27, 1961, Ser. No. 94,958, now Patent No. 3,158,732, dated Nov. 24, 1964. Divided and this application Oct. 5, 1964, Ser. No. 401,289
5 Claims. (Cl. 219—72)

This application is a division of my copending application Serial No. 94,958 filed February 27, 1961, and now Patent No. 3,158,732, dated November 24, 1964.

The present invention relates to apparatus for joining in a vacuum metals, alloys and materials different in kind.

Known installations, arrangements and methods for joining metals by hot hand cold welding, including welding in an atmosphere of inert gas, which require the use of electrodes, fluxes, solders or the expenditure of large amounts of energy, as required in electrical resistance welding, do not provide the possibility of joining heterogeneous metals, alloys, rare metals, nor the possibility of joining metals to non-metallic materials or the like.

The techniques proposed herein for joining to each other metals, alloys, and rare metals different in kind and for joining metals to non-metallic materials are free from the above shortcomings and provide the possibility of joining to each other, without the use of electrodes, solders, fluxes, etc., heterogeneous metals and alloys, and also the possibility of joining metals to non-metallic materials and articles made of them, among which are combinations such as: cast iron-steel; steel-copper; steel-metallo-ceramics; steel-ceramics; steel-tungsten; steel-aluminum; steel-non-ferrous metal alloys; aluminum-copper; as well as such joining combinations as: non-ferrous metals to rare metals and their alloys, and rare metals and their alloys to each other. The apparatus proposed herein is based upon the diffusion of atoms and molecules between the metals, alloys and non-metallic materials being joined, this diffusion taking place under contactless or contact heating of the articles to be joined to temperatures up to about 1000° C., i.e. at temperatures exceeding the recrystallization temperature of one or several of the components being joined, or with the said diffusion taking place without supplementary heating and at temperatures up to +20° C. In the latter case, the rate and direction of diffusion required for accomplishing joining of the parts is provided for by passing pulses of current of alternate polarity perpendicular to the part faces being joined. In either case, i.e. both with heating and without heating, joining of the parts is carried out under a vacuum ranging from $10^{-2}$ to $10^{-7}$ mm. Hg, thereby ensuring a highly pure atmosphere within the working chamber and thus providing for excellent mutual diffusion of the atoms and molecules in the parts to be joined. Furthermore, when the parts to be joined reach the required temperature, they are subjected to a pressure of 1 to 2 kg. per sq. mm., this not effecting any plastic deformation.

The present apparatus represents a new branch in welding technology. Joints obtained by the same have a strength adequate for machine parts subjected to heavy loading.

In contrast to formerly known techniques of welding and soldering, the heat resistance and resistance to aggressive mediums will be determined only by the physical-mechanical and chemical properties of the joined materials.

The mechanical strength of these joints is such that break-down in all cases takes place in a zone outside the joint. Metallographic examinations have revealed high densities in the materials which, in the zone of contact, are of greater specific weight than in the areas beyond it.

Any changes in physical-mechanical properties which always accompany formerly known techniques of welding and soldering are completely excluded. The methods proposed herein are equally effective in the joining of parts differing considerably between each other in dimension and mass, and in the joining of materials differing in thermo-physical properties. No cracks will be found to exist in these joints.

To carry out the invention, several forms of apparatus are proposed herein, these forms depending upon the nature of the parts to be joined, the combination to be achieved, and the properties of the materials to be joined.

These forms of apparatus differ from each other in design and production capacity. They comprise the following: a vacuum-tube oscillator or machine-type generator operated in conjunction with induction coils for heating the parts to be joined with high-frequency currents when utilizing non-contact heating, or a welding type transformer operated in conjunction with a current interrupting device when utilizing contact resistance heating, a vacuum chamber or several vacuum chambers, a rotary-type oil pump for creating a low vacuum, an oil-jet diffusion pump for creating a high vacuum, a hydraulic pump operated in conjunction with a hydraulic cylinder for applying the necessary pressure to the parts being joined, and also suitable auxiliary and measuring-indicating equipment.

Figure 2:
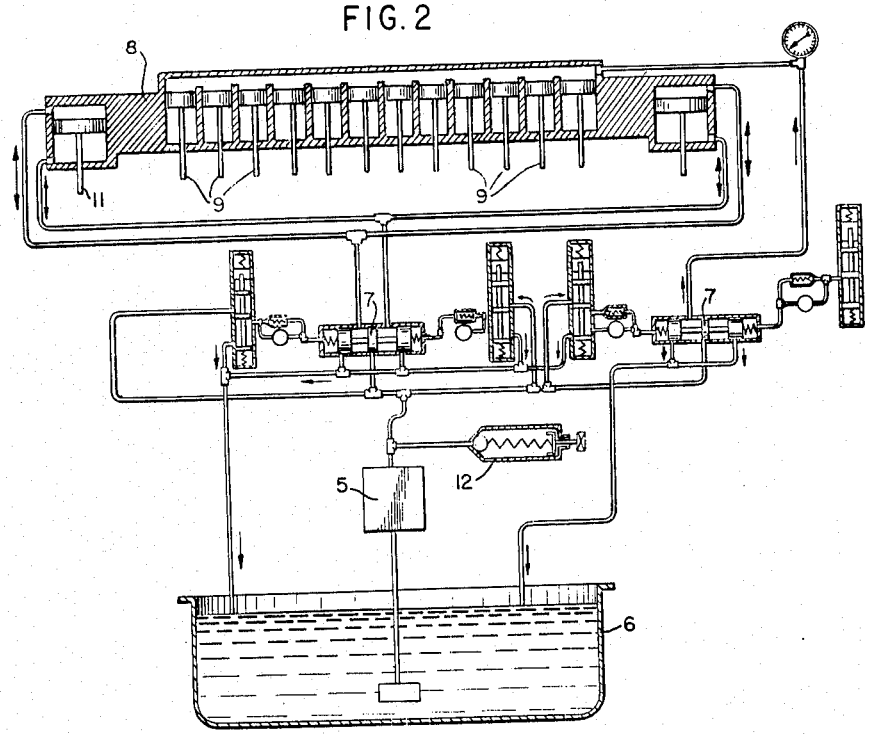
Figure 3:
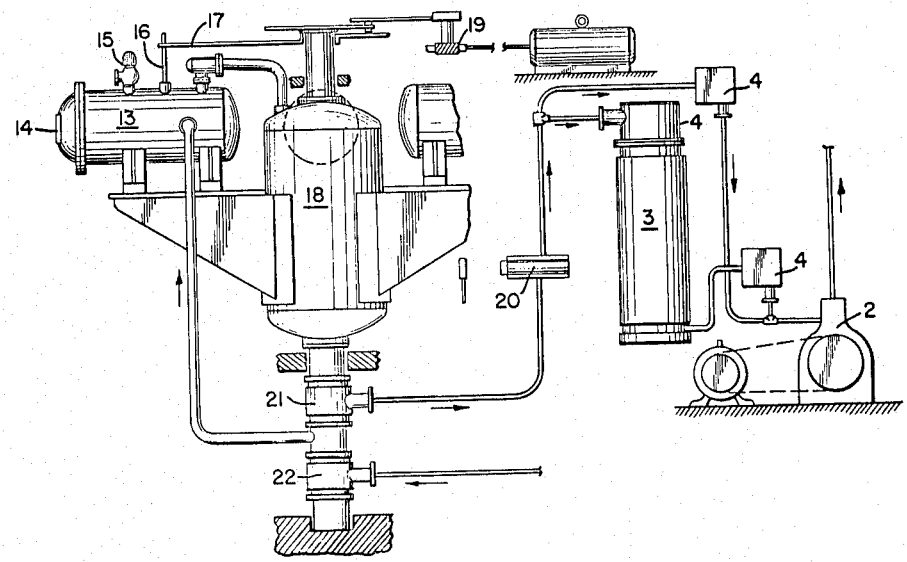
Figure 4:
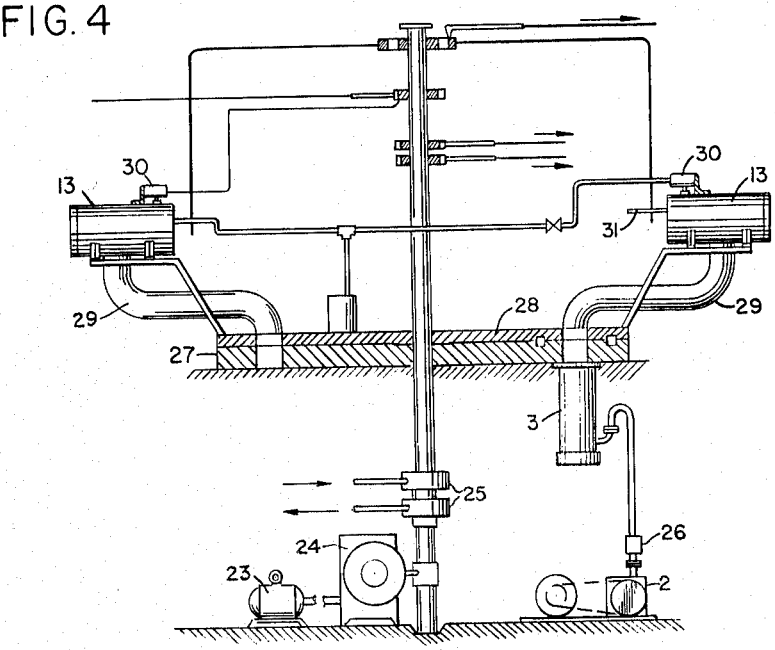
Figure 6:
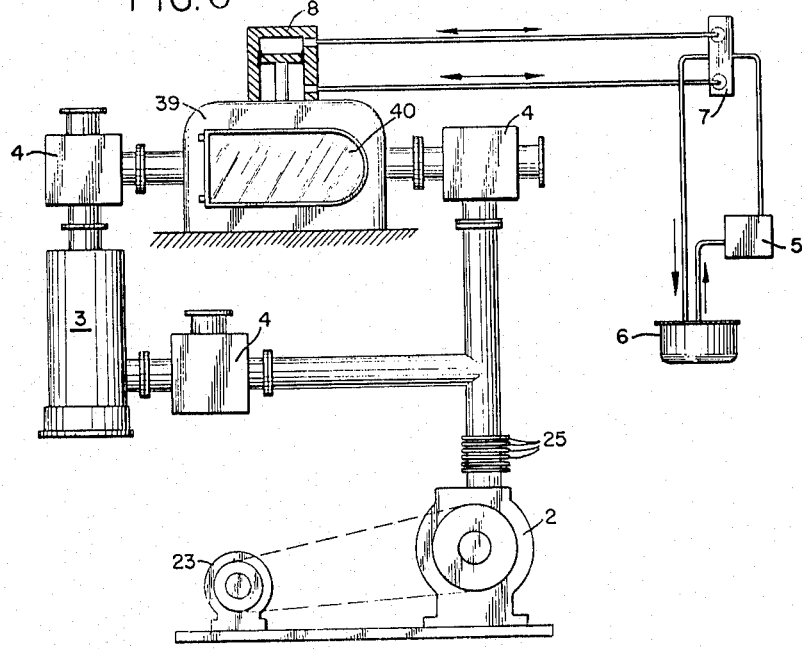
Figure 5:
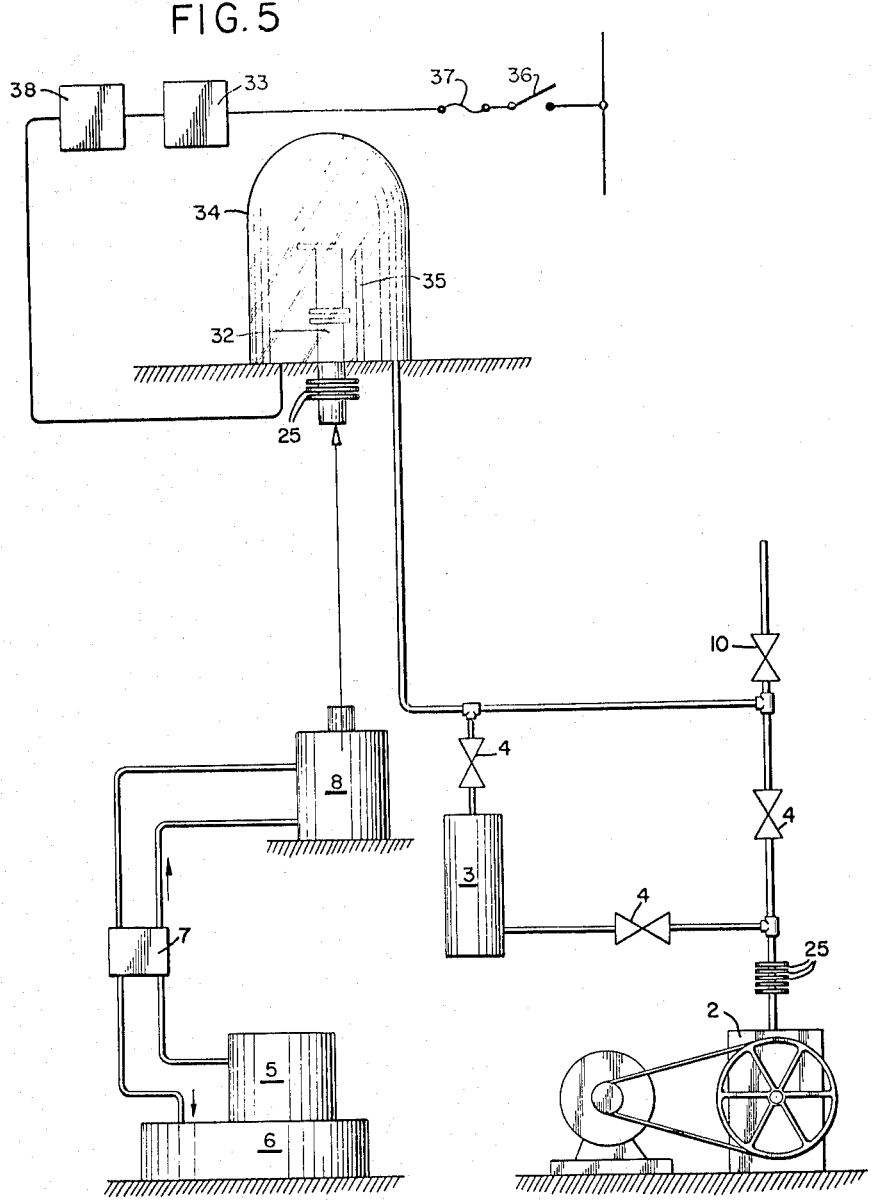

In FIG. 1 is shown a schematic diagram of a diffusion-joining vacuum installation for accomplishing simultaneous joining of twelve sets of parts. A diagram of the hydraulic system of the installation illustrated in FIG. 1 is shown in FIG. 2. The schematic representation of a semi-automatic four-position chamber diffusion-joining vacuum installation is shown in FIG. 3. In FIG. 4 is shown a schematic representation of a semi-automatic five-position (five-chamber) installation. FIG. 5 shows a schematic diagram of an installation employing contact-resistance heating and arranged for the application of pressure from underneath. In FIG. 6 is shown a diagrammatic representation of a diffusion-joining installation for the joining of non-ferrous metal parts to rare metals and their alloys, and also of rare metals and their alloys to each other.

The joining of parts as shown in FIG. 1 is carried out in vacuum chamber 1, provided with water cooling in its upper part and a heat screen located above the parts being joined. These parts are arranged in a special fixture made to suit their particular shape and dimensions and located at a distance of 0.5 to 1.5 mm. from the induction heating coil. Exhausting of the air and gases from the working chamber after the chamber has been closed is performed first by low vacuum pump 2 and then, to obtain a higher vacuum, by oil-jet diffusion pump 3, operated in conjunction with the low vacuum pump. At the jet vacuum and low vacuum pump outlets and also between the pumps are arranged interlocked shut-off valves 4, the opening and closing of which is controlled from the installation control panel, this allowing the hot oil of the oil-jet diffusion pump to be protected against the oxygen from the air and the pump to be kept in "hot" condition after the first warm-up of the diffusing oil. As soon as the required vacuum is attained, high-frequency current is fed into the induction heating coil from a vacuum-tube oscillator or a machine-type generator and, when the parts to be joined reach the present temperature, hydraulic system pump 5 is switched on, the latter providing a supply of oil from tank 6 and through reversing slide valves 7 to stationary cylinder block 8 by means of which, with the aid of push rods 9, the necessary pressure is applied to the parts under work. On attainment of the required contact pressure (controlled by readings of a pressure gauge), a relief valve is operated to maintain the pressure at the preset value over the necessary interval of holding time under given process conditions (of temperature and vacuum). Following this, the current is switched off and the parts are allowed to cool down under pressure to an adequate temperature (depending on the compositions of the joined parts). Next, air inlet valve 10 is opened and hydraulic pump 5, which serves to feed the oil into the hydraulic system, is switched off. By means of reversing slide valve 7 and chamber lifting-lowering push rod 11, the chamber is lifted in order to remove the joined parts, to reload the fixture with a new set of parts to be joined, and to proceed with the next cycle of operation. The installation is operated with the aid of indicating instruments—vacuum gauge and a potentiometer—arranged on the control panel, on which are also mounted push buttons to control switch-on and switch-off of the heating system and pumps, and opening and closing of the shut-off valves, etc.

For convenience in operation, working chamber 1 is supplied with sight glasses.

The hydraulic system of the above installation (FIG. 2) operates as follows: from oil tank 6 and with the aid of hydraulic-system pump 5, oil is fed into cylinder block 8 in which a longitudinal channel has been provided to apply the oil pressure to twelve push rods 9 serving to transmit the pressure to the parts placed in the vacuum chamber for joining. The magnitude of the contact pressure is registered by a pressure gauge at a fixed level and maintained at this level by relief valve 12.

Hydraulic system pump 5 also provides a supply of oil to the hydraulic system through reversing slide valves 7 for vacuum chamber lifting and closing.

The apparatus shown in FIG. 3 provides increased production capacity by employing a four-working-position arrangement, i.e. four chambers in which the following pressures are maintained:

(a) in loading and unloading position—atmospheric pressure (b) in temperature-raising position—up to $10^{-3}$ mm. Hg.

(c) in diffusion-joining position—up to $10^{-5}$ mm. Hg.

(d) in cool-down position—gradual rise to atmospheric pressure.

The specific pressure applied to the parts in the process of joining will be the following: in position "a"—of normal value; in position "b," "c" and "d"—of increased value, up to 2 kg. per sq. mm. The specific pressure is regulated within the range 0.4 to 2 kg. per sq. mm. and achieved with the aid of pressure springs or a hydraulic system, built into the mechanism serving for receiving and clamping of parts being joined, and arranged so that the above devices are not subjected to the heating action.

The maximum temperature to which the parts being joined are to be heated should range up to between 950 and 1000° C. and should not be maintained for more than 3 minutes.

Vacuum chambers 13 (as concerns FIG. 3) in contrast to vacuum chamber 1, are built in the form of a cylinder and are supplied with a window 14 serving both for loading and unloading of parts and for visual observation of the joining process. These chambers in which the part joining is carried out are equipped with a draw-out mechanism rolled out through window 14 and comprising clamping and centering fixtures, and calibrated springs creating a constant specific pressure throughout the entire processing period, from start of temperature raising to end of cool down. This installation is equipped with the necessary current-conducting and measuring-indicating devices. Regulation of air inflow is accomplished with the aid of solenoid-type valve 15 operated by electric controls. Heat energy for joining of parts is supplied by a high-frequency vacuum-tube oscillator or a machine-type generator from which the electric current flows through bus bar 17 into induction heating coil 16.

For swift manipulation of the shut-off valve located between the vacuum chamber 13 and equalizing receiver 18, interlocked shut-off valves 4 are used, the latter having individual electrical actuators.

For convenience in operation (servicing) supporting receiver 18 and vacuum chambers 13 are mounted as a vertically pivoted assembly, rotated by an individual electric motor through speed reduction system 19 and a turning device.

Equalizer receiver 18 has a selected volume equal to twice the total volume of the vacuum chambers.

To prevent ingress of water and oil vapors to the equalizer receiver, a nitrogen freezing trap 20 is incorporated.

All rotary sealing devices—vacuum system 21 and hydraulic system 22—are built to standards current in vacuum technique.

Control over changes in the joining process cycle and in corresponding separate operational time intervals is exercised by an electrical master device.

Joining process control is carried out from a control console or panel on which are mounted all the control and measuring-indicating devices.

In FIG. 4 is shown a schematic representation of a five-position vertical-pivot mounted diffusion-joining installation with no equalizing receiver. In the five chambers of this installation, the following pressures are maintained:

(a) in loading-unloading position—atmospheric pressure (b) in low vacuum position—up to $5 \times 10^{-3}$ mm. Hg (c) in high-vacuum position—up to from $10^{-6}$ to $10^{-3}$ mm. Hg (d) in diffusion-joining position—up to from $10^{-8}$ to $10^{-6}$ mm. Hg (e) in cool-down position—$10^{-3}$ mm. Hg, with gradual inlet of air.

In carrying the out the joining, the parts are subjected to pressures and temperature identical to those used in the four-position installation, but the "holding" time is increased to from 5 to 10 minutes. Conditionally, only two of the positions are represented in the schematic diagram.

Rotating assembly drive in this installation is accomplished by an individual electric motor 23 through speed reduction 24 and under timing relay control.

Cooling water inlet and discharge is provided by rotary-type seals 25 of accepted standard design.

The vacuum in the above-mentioned positions "b," "c," and "d" is created by three low vacuum pumps 2. To improve shock absorption and air tightness, bellows 26 are installed at the outlet of the low vacuum pumps.

In addition to the above, two jet-type diffusion pumps 3 are arranged at positions "c" and "d." One low vacuum pump 2 at position "b," and the two jet-type diffusion pumps 3 at positions "c" and "d" are connected directly to the stationary disc of lower vacuum slide valve 27. On the movable disc of upper slide valve 28 are mounted five vacuum chambers 13, which are connected by vacuum tubes 29 with the movable slide-valve disc. Four ports are provided in the stationary slide-valve disc; at the "b" position—for communication with the low vacuum pump; at positions "c" and "d"—for communication with a jet-type diffusion pump; and at the "a" position—for providing communication between the vacuum chamber and the atmosphere.

Hydraulic system pump 5 is mounted within the rotating assembly, to supply oil under pressure through the slide valve unit to hydraulic cylinder 30, from which pressure is transmitted over a push rod to the parts being joined. This pressure is maintained in the two positions "d" and "e."

Heating energy in this installation is supplied by a vacuum-tube oscillator or a machine-type generator operated in conjunction with an induction heating coil 31.

A control console or panel on which all the control and measuring-indicating devices are mounted is used to control the entire joining process.

In FIG. 5 is shown the schematic diagram of a diffusion-joining vacuum installation in which contact-resistance heating is used in the joining of parts. The pressure herein is transmitted to the parts being joined from below and by means of an electrode. To raise the production capacity, the jet-type diffusion pump is kept continuously in working condition. The specific pressure on the parts can be regulated within a 0 to 12.5 kg. per sq. mm. range.

The pressure applied to the parts under work and obtained from the hydraulic cylinder is transmitted through cooled lower electrode 32. Heating of the parts being joined can be regulated within a temperature range of from 300 to 900° C., with "holding" times not over 0.5 to 2 minutes. For this purpose, the installation is equipped with an ignition contactor 33 and a capacitive-type timing relay. Oil is fed to hydraulic cylinder 8 from oil tank 6 by means of the hydraulic system pump 5 and through reversing slide valve 7, which controls raising and lowering of the piston, and thus applies pressure to the parts being joined.

With the aim of creating a rigid system, bracket 35 is arranged inside chamber 34. The parts being joined are heated by electric current supplied to electrode 32 from the supply circuit by means of switch 36, fuse 37, ignitron contactor 33 and transformer 38.

The vacuum systems in this installation do not differ from the systems used in the installations described above. To facilitate visual supervision, chamber 34 can be made of some suitable transparent material.

In FIG. 6 is shown the schematic representation of a diffusion-joining vacuum installation intended for joining non-ferrous metals to rare metals and their alloys, and also for joining rare metals and their alloys to each other. Part joining is carried out within vacuum chamber 39 having double walls between which water is circulated for cooling. Two pumps serve to create a vacuum within the chamber-low vacuum pump 2 and jet-type diffusion pump 3. Incorporated in the vacuum system are interlocked shut-off valves 4.

In this installation, contactless heating is carried out after the required vacuum is reached, the source of supply being a high-frequency vacuum-tube oscillator or machine-type generator. When the present temperature is achieved, the hydraulic system provides for application of a predetermined pressure to the parts being joined by means of hydraulic pump 5 and through hydraulic cylinder 8.

The operation of this installation is controlled by the readings of a vacuum gauge and a potentiometer, arranged on a control console or panel.

For convenience of operation, vacuum chamber 39 is provided with observation window 40.

What is claimed is:

1. An apparatus for joining heterogeneous metals and alloys and metals to non-metallic materials, comprising four cylinders providing chambers for receiving articles to be joined and having access windows, hydraulic means in said chamber for applying a clamping pressure to said articles, heating means in said chambers for heating said articles, an equalizing receiver connected to said chambers and having a volume equal to twice the total volume of said chambers, a freeze type moisture trap connected to said receiver, an oil rotary type vacuum pump connected to said trap for providing a relatively low preliminary vacuum, an oil jet diffusion vacuum pump connected to said trap for providing a high final vacuum and interlocked shut-off valves on the outlets of said diffusion pump to maintain said last-named pump in hot condition subsequent to the initial heating of the diffusing oil.

2. An apparatus for joining heterogeneous metals and alloys and metals to non-metallic materials, comprising a table mounted for rotation about a vertical axis, five vacuum chambers mounted on said table for receiving articles to be joined, hydraulic means in said chambers for applying a clamping pressure to said articles, heating means in said chambers for heating said articles, three relatively low vacuum pumps, two diffusion type high vacuum pumps and valve means operable by rotation of said table to connect said low vacuum pumps and said high vacuum pumps in succession to said chambers.

3. An apparatus for joining heterogeneous metals and alloys and metals to non-metallic materials, comprising a transparent vacuum chamber, a bracket mounted in the chamber for receiving articles to be joined, a water-cooled electrode in said chamber for engaging the articles, hydraulic pump and a hydraulic cylinder for applying clamping pressure to the articles, an ignition contactor, a capacitor type timing relay and a transformer for supplying electrical energy to said electrode to provide for contact resistance heating of the articles without fusing the same in a very limited area during a variable heating time of the order of 0.5–2 minutes, a fore vacuum pump and an oil jet pump operably connected said chamber for providing the required vacuum.

4. An apparatus for joining homogeneous and heterogeneous metals, alloys and non-metallic and metallic materials to non-metallic materials by diffusion, comprising, a vacuum chamber having walls and a base plate for receiving parts of articles and assemblies to be joined, heating means for the chamber, a heat source for supplying heat to the heating means, means for reducing heat losses and for raising the efficiency of heating of the articles in the vacuum chamber including a heat screen overlying the articles to be joined and providing cooling for the walls, the base plate and the upper portion of the chamber, a hydraulic cylinder and piston means for applying the required pressure to the articles to be joined and for lifting and lowering the chamber, vacuum pumps operably connected to the chamber for effecting the required evacuation thereof, one of the pumps being of an oil rotary type for providing a relatively low preliminary vacuum and the other pump being of an oil jet diffusion type for providing a high final vacuum, and interlocked shut-off valves on the outlet of said diffusion pump for maintaining said pump in hot condition subsequent to the initial heating of the diffusing oil.

5. An apparatus for joining heterogeneous metals and alloys and metals to non-metallic materials, comprising a vacuum chamber for receiving articles to the joined, a hydraulic cylinder overlying the chamber, a water jacket for cooling said chamber, an observation window in said chamber, a force vacuum pump and an oil jet pump for effecting the desired evacuation of the chamber, hydraulic pump means for developing the required pressure on the articles by the cylinder, and heating means in said chamber for heating the articles to the required temperature.

References Cited by the Examiner

UNITED STATES PATENTS

| 2,024,239 | 12/1935 | McBain | 219—86 |
| 2,943,181 | 6/1960 | Gunow et al. | 219—85 |
| 3,018,357 | 1/1962 | Kramer et al. | 219—72 |
| 3,020,387 | 2/1962 | Busche et al. | 219—72 |

ANTHONY BARTIS, Acting Primary Examiner.

RICHARD M. WOOD, Examiner.